United States Patent [19]
Devic

[11] Patent Number: 5,675,773
[45] Date of Patent: Oct. 7, 1997

[54] GRAPHICS DISPLAY SYSTEM WITH A LOW LEVEL HARDWARE DEPENDENT GRAPHICS LIBRARY

[75] Inventor: Goran Devic, Austin, Tex.

[73] Assignee: Cirrus Logic, Inc., Fremont, Calif.

[21] Appl. No.: 576,872

[22] Filed: Dec. 21, 1995

[51] Int. Cl.$^6$ .................................................. G06F 15/16
[52] U.S. Cl. ........................................ 395/503; 395/522
[58] Field of Search ................................... 395/501–503, 395/507, 522, 526, 118–119, 125, 130, 133

[56] References Cited

U.S. PATENT DOCUMENTS 5,561,752  10/1996  Jevans ..................................... 395/133

*Primary Examiner*—Kee M. Tung
*Attorney, Agent, or Firm*—Wagner, Murabito & Hao

[57] ABSTRACT

A low level hardware dependent graphics library (binding library) between hardware independent graphics libraries and a graphics hardware unit. The binding library procedures provide a relatively low level interface that couples directly with the graphics hardware unit and only requires a relatively small amount of rewriting to accommodate different graphics hardware units while requiring no change of the hardware independent graphics libraries. The binding library procedures provide a quality meter adjustable between low speed processing high quality image rendering and low quality but faster speed image rendering. The binding library procedures perform batch processing by receiving an array of batch cells, each batch cell comprising a separate primitive. The batch array can be handed off to the binding library procedures at one setting and then processed sequentially. This configuration insures that no instruction cache misses occur during parameterization of the array (e.g., the parameterization routine fits within a standard code cache) and that few data cache misses occur. Also, the binding library procedures allow automatic translation between different texture mapping data formats so that either RGB-alpha format can be used or a format using an index into the color pallet can be used. By providing a low level interface, the present invention provides a system that is readily adaptable to different hardware graphics accelerators without requiring modifications to the graphics libraries.

20 Claims, 13 Drawing Sheets

GRAPHICS DISPLAY SYSTEM WITH A LOW LEVEL HARDWARE DEPENDENT GRAPHICS LIBRARY

FIELD OF THE INVENTION

The present invention relates to the field of computer controlled graphics display systems. Specifically, the present invention relates to software programs for interfacing to hardware graphics accelerators.

BACKGROUND OF THE INVENTION

High quality and high performance computer controlled graphics rendering systems rely largely on specialized electronic circuit boards for processing graphic information at high speed. These specialized electronic circuit boards are also called "graphics accelerators" or "graphics hardware units." Graphics accelerators are specially designed to process graphics data associated with graphics primitives (e.g., lines, polygons, triangles, shaded or alpha blended triangles etc.), as are known in the art, to render an image on a computer display unit. The graphics data supplied to the graphics accelerators are supplied in a hardware dependent format ("hardware dependent graphics data") that is recognized by the graphics accelerator. This hardware dependent graphics data is typically generated in the form a display list in computer memory.

Within a multi-layer graphics system, the graphics accelerator operates at the lowest level layer to manipulate pixels to render an image on the computer display. The graphics accelerator performs low level graphics operations which translate microinstructions within a display list into the image on a computer display. In higher level layers, software programs ("applications") executing within the graphics system generate requests for displaying certain images. These requests typically include a list of hardware independent graphics primitives (e.g., that represent the image) that are passed to intermediary high level graphics libraries and then to the graphics accelerator for rendering. The high level graphics libraries support a large number of graphics commands and features and typically include procedures for transforming the application's requests directly into hardware dependent display lists.

Since the graphics accelerators are hardware devices, they are very design specific and vendor specific. In other words, different graphics accelerators operate using different graphics data formats (e.g., different data structures, different graphics rendering codes, different memory partitions and locations, etc.) and using different cache assignments.

FIG. 1A illustrates a prior art graphics display system 5 in accordance with the above. The system 5 includes a high level application program 10 executable within a digital computer system. The application program 10 interfaces with high level graphics libraries 12 and 14 for translating graphics display requests from application 10 to hardware dependent display lists. Two well known graphics libraries are the Three Dimensional Dynamic Device Driver Interface ("3D DDI") library 12 and the Open Graphics Library ("Open GL") library 14. These libraries 12 and 14 contain a number of hardware specific rendering routines ("procedures") that directly interface with the graphics hardware unit 18 (e.g., accelerator board) via an interface 16. The interface 16 does not make the hardware unit 18 transparent, it serves only to facilitate communication protocol between libraries 12 and 14 and the hardware unit 18. The procedures of the libraries 12 and 14 input graphics rendering requests from the application program 10. The graphics hardware unit 18 is coupled to computer screen 20 for rendering images thereon. Although shown as separate, during compilation and linking, the required procedures of the libraries 12 and 14 of FIG. 1A are typically included to form the instructions of high level application 10. Application 10 can also include instructions that originate from a number of different libraries aside from graphics library 12 and graphics library 14.

The procedures of the graphics libraries 12 and 14 allow the high level application 10 to communicate (using hardware independent data structures) with the graphics hardware unit 18 by generating very structured and hardware dependent communication protocols and data structures. The graphics libraries 12 and 14 include sets of very high level hardware dependent software routines that are hardware dependent but provide a hardware transparent interface for the application 10. Since the libraries 12 and 14 are high level, they support a wide variety of complex graphics features and display options. In order to implement either library 12 or 14 to support any particular hardware unit 18, all of the library functions and features must be implemented in the particular format of the selected hardware unit 18. Thus, these high level graphics libraries 12 and 14 need to be extensively redesigned and rewritten for each different hardware unit 18 they support. This is undesirable for graphics system designers because a large degree of software redesigning and rewriting is required of each library 12 and 14 to support different hardware units 18. It would be desirable to provide a graphics system that is more readily adaptable to changes and variations in the graphics hardware unit 18. Specifically, it would be desirable to provide a software system that does not require redesigning and rewriting of the high level graphics libraries 12 and 14 upon application of different graphics hardware units 18.

Refer to FIG. 1A and FIG. 1B. FIG. 1B illustrates a flow diagram of a prior art computer implemented process 30 for processing graphics primitives. This process 30 is implemented within prior art computer controlled graphics display system 5 (FIG. 1A). Process 30 starts at block 32 where the high level application program 10 requests rendering of a data structure representing an individual graphics primitive (e.g., line, polygon, triangle, etc.) on display 20. At block 34, the application 10 passes the hardware independent data structure representing the graphics primitive to a procedure of the graphics library 12 or 14. At block 36, the graphics library 12 or 14 translates the data structure of the graphics primitive into a set of low level microinstructions that are specific to hardware unit 18. These microinstructions are often part of a "display list" that is readable by the hardware unit 18. At block 38, the hardware unit 18 accesses the display list to render the graphics primitive on the display screen 20. Subsequent primitives originating from the application program 10 are then processed in like manner since it typically requires a plurality of graphics primitives to render a complete image.

The process 30 of FIG. 1B does not make efficient use of memory resources within the graphic system 5 because each primitive from block 32 is processed serially between the high level application 10 and the hardware unit 18 (e.g., between blocks 32 and 38). Specifically, within the rendering process of a single graphics primitive, procedures within application 10 are first executed followed by procedures of the graphics library (12 or 14), and this process is repeated for subsequent primitives. This circumstance causes a disjunction to occur within code and data caches because different information and instructions are passed through these cache units during execution of the procedures of (1) the high level application 10 and then (2) the procedures of the graphics library 12 or 14. The result is that many data cache misses and code cache misses occur during rendering of a set of graphics primitives. It would be advantageous, then, to provide a graphics rendering process that operates more efficiently in rendering an image comprised of a set of graphics primitives that originate from the application program 10.

Accordingly, the present invention provides a graphic system that readily adapts to different hardware units without requiring redesign or rewriting of the high level graphics library. Further, the present invention provides a graphic system that efficiently utilizes memory resources to render an image from a plurality of graphics primitives that originate from an application program. These and other advantages of the present invention will become apparent within discussions of the present invention herein.

SUMMARY OF THE INVENTION

In accordance with the present invention, a low level hardware dependent graphics library provides an interface between a high level graphics libraries (which are preferably hardware independent) and a graphics accelerator hardware unit. The low level hardware independent library provides a relatively low level interface that communicates directly with the graphics accelerator and only requires a relatively small amount of rewriting to accommodate different graphics hardware units while requiring little or no change of the high level hardware independent graphics libraries. The low level hardware dependent library procedures provide a quality meter adjustable between low speed processing high quality image rendering and low quality but faster speed image rendering. The low level hardware dependent library procedures perform batch processing by receiving an array of batch cells, each batch cell comprising a separate primitive. The array can be handed off to the low level hardware dependent library procedures at one setting and then processed sequentially. This configuration insures that no instruction cache misses occur during parameterization of the array (e.g., the parameterization routine fits within a standard code cache, e.g., of 8K) and that few data cache misses occur. Also, the low level hardware dependent library procedures allow automatic translation between different texture mapping data formats so that either RGB-alpha format can be used or a format using an index into the color pallet can be used. By providing a low level interface, the present invention provides a system that is readily adaptable to different hardware graphics accelerators without requiring modifications to the graphics libraries.

Specifically, embodiments of the present invention include a computer controlled graphics display system having: a processor coupled to a bus; a memory unit for storing information which operates in conjunction with the processor; a hardware graphics unit for receiving hardware dependent microinstructions from a display list stored in the memory unit and for generating an image onto a display screen; a high level graphics library comprising hardware independent graphics rendering procedures executed by the processor, the hardware independent graphics rendering procedures for processing graphics rendering requests from a high level application to produce hardware independent output data structures including graphics operands; and a low level hardware dependent graphics library executed by the processor for processing the hardware independent output data structures to generate therefrom the microinstructions for the hardware graphics unit, wherein the high level graphics library is compatible with a variety of different hardware graphics units without redesign and wherein the hardware independent output data structures from the high level graphics library comprise an array of batch cells, each batch cell representing a separate graphic operation to be performed, and wherein the array of batch cells is passed to the low level hardware dependent graphics library to be processed in sequence to generate the microinstructions.

Embodiments further include the above and wherein the low level hardware dependent graphics library comprises parameterization procedures for processing polygon primitives, sets of graphics lines, and sets of graphics points and wherein the parameterization procedures are further for processing bit level transfers, fills, and translations between texture map formats.

Embodiments further include the above and wherein the low level hardware dependent graphics library further comprises a performance/quality adjustment procedure executed by the processor for adjusting rendering performance rate and correspondingly adjusting rendering quality of the image displayed on the display screen. Embodiments further include a method for generating a display list in accordance with the above.

DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

SECTION I

COMPUTER SYSTEM

Figure 1A:
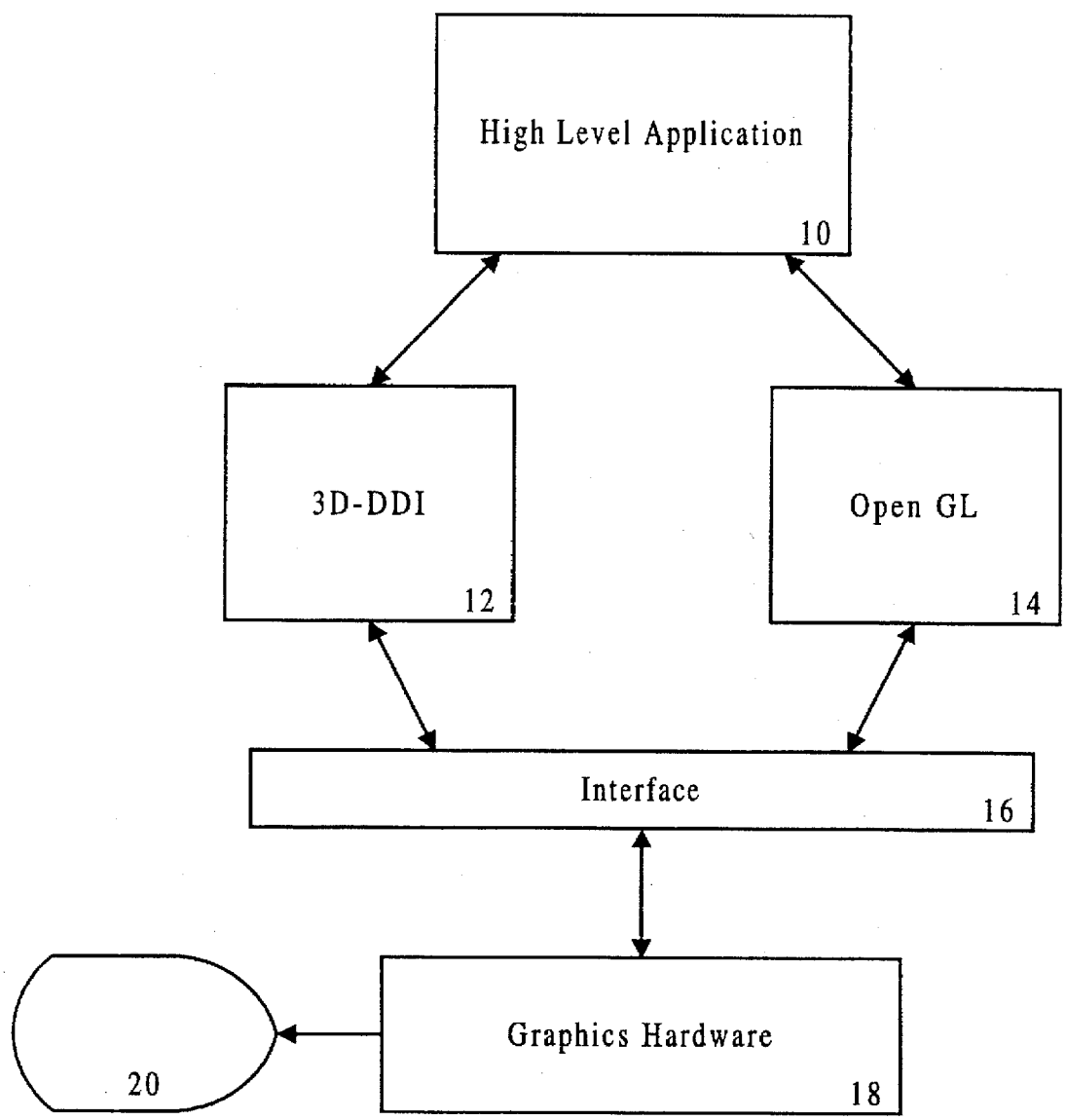
FIG. 1A illustrates a prior art graphics display system with hardware dependent versions of graphics libraries (e.g., 3D-DDI and OPEN GL).
Figure 1B:
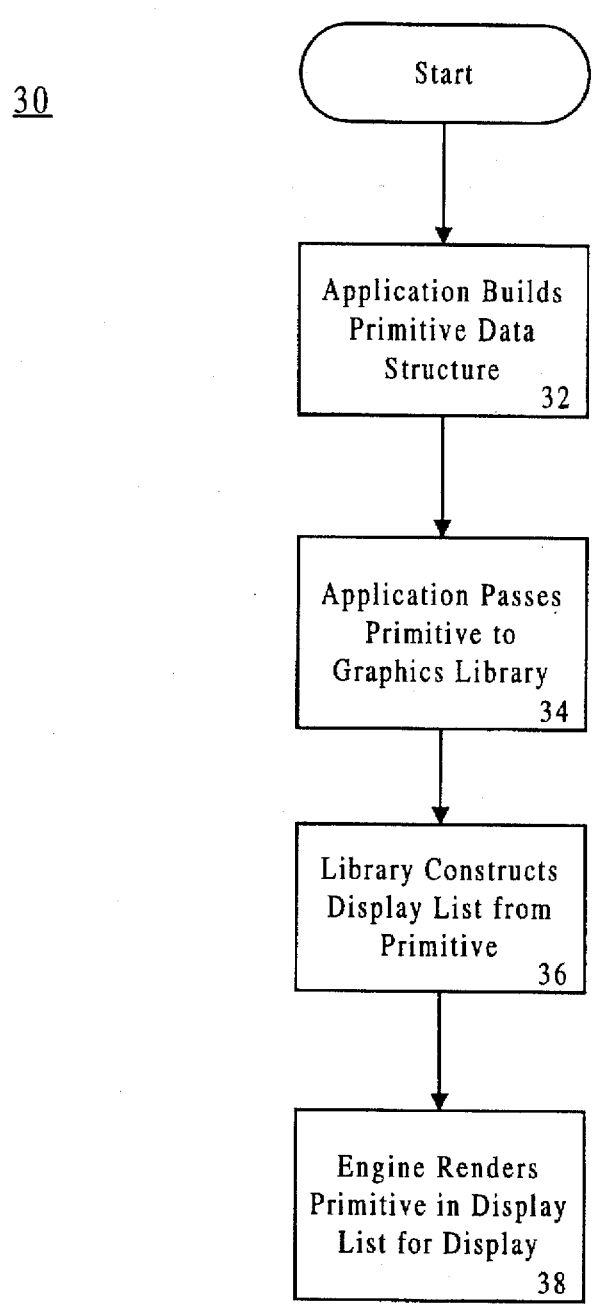
FIG. 1B illustrates a flow diagram of a prior art process for rendering graphics primitives.
Figure 2:
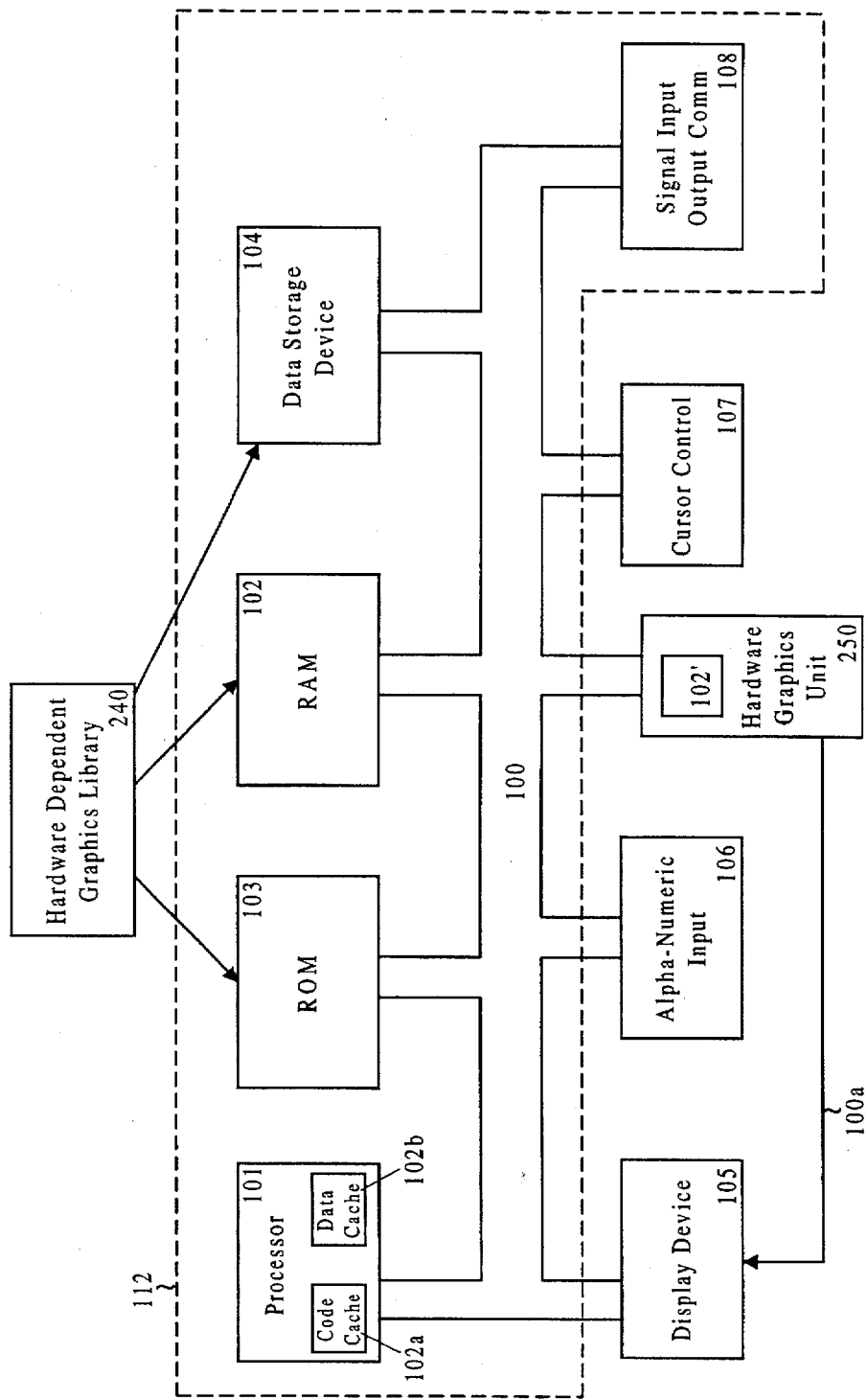
FIG. 2 is a block diagram of a computer system for a computer controlled graphics display system of the present invention.

The application program (210 of FIG. 3), the high level graphics libraries 220 and 230 and the low level hardware dependent graphics library ("HDGL") 240 of the present invention are comprised of computer executable instructions which reside in a computer controlled graphics display system of the present invention. These elements are described further below. FIG. 2 illustrates an exemplary computer system 112 used as a part of a computer controlled graphics display system in accordance with the present invention. Computer system 112 of FIG. 2 is exemplary only, and the present invention can operate within a number of different computer systems including general purpose computers systems, embedded computer systems, and computer systems specially adapted for graphics display which may or may not comprise the same elements interrelated in the same manner as illustrated in FIG. 2.

Computer system 112 of FIG. 2 includes an address/data bus 100 for communicating information, a central processor unit 101 coupled with the bus 100 for processing information and instructions, a read/write memory 102 (e.g., random access memory, or other read/write memory such as FLASH memory, etc.) coupled with the bus 100 for storing information and instructions for the central processor 101, a read only memory 103 coupled with the bus 100 for storing static information and instructions for the processor 101. System 112 includes a data storage device 104 (e.g., a magnetic or optical disk and disk drive) coupled with the bus 100 for storing information and instructions. System 112 also includes a display device 105 coupled to the bus 100 (or alternatively can be directly coupled to hardware unit 250 via bus 100a) for displaying information (e.g., graphics primitives) to a computer user. System 112 can optionally include an alphanumeric input device 106 (e.g., a device including alphanumeric and function keys) coupled to the bus 100 for communicating information and command selections to the central processor 101. System 112 can optionally include a cursor control device 107 coupled to the bus 100 for communicating user input information and command selections to the processor 101. System 112 can optionally include a signal generating device 108 coupled to the bus 100 for communicating command selections to the processor 101. Processor 101 contains an instruction or code cache 102a and a data cache 102b (e.g., specially located RAM).

The display device 105 of FIG. 2 utilized within the computer system 112 of the present invention may be a liquid crystal device, cathode ray tube, or other display device suitable for creating graphic images and alphanumeric characters recognizable to the user. The optional cursor control device 107 allows the computer user to dynamically signal the two dimensional movement of a visible symbol (pointer) on a display screen of the display device 105. Many implementations of the cursor control device am known in the art including a trackball, mouse, touch pad, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices as described above. Also coupled to bus 100, or alternatively directly coupled to display device 105 (via bus 100a), is a graphics hardware (e.g., graphics accelerator) unit 250 for high speed graphics rendering. The graphics hardware unit 250 can also contain video and other memory 102' (e.g., RAM for storing display lists and/or registered texture maps).

FIG. 2 illustrates that the low level hardware dependent graphics library (HDGL) 240 of the present invention can reside in RAM 102, ROM 103, storage 104. During operation, a portion of HDGL 240 can also reside in code cache 102a.

Figure 3:
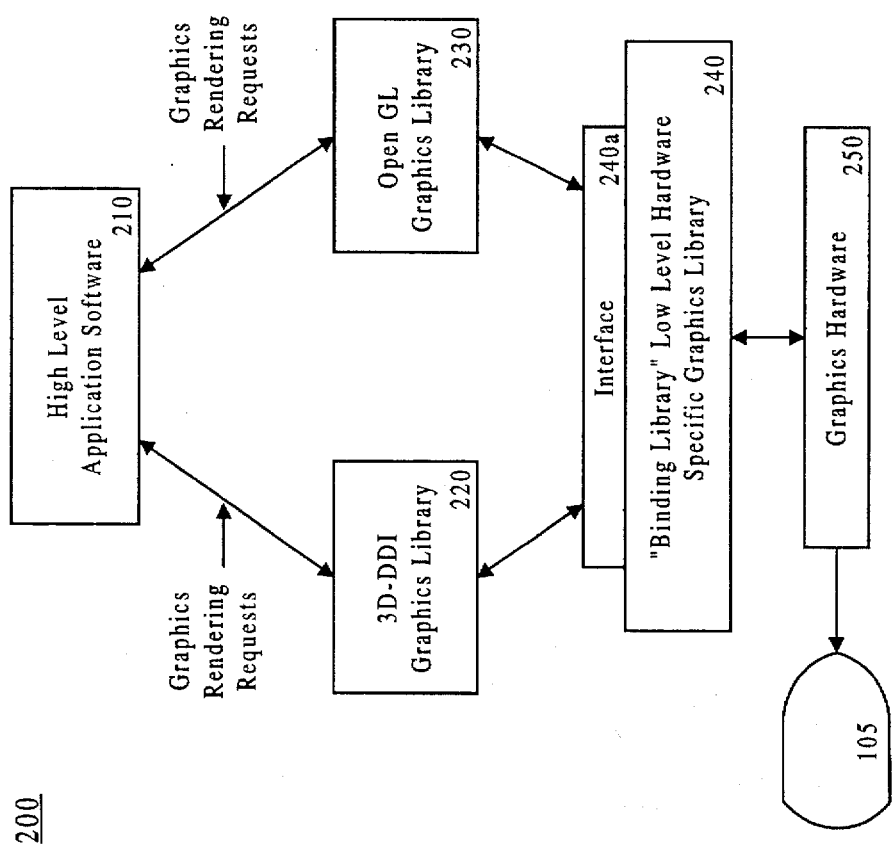
FIG. 3 illustrates the layers of a computer controlled graphics display system of the present invention having hardware independent versions of high level graphics libraries (e.g., 3D-DDI and OPEN GL).

FIG. 3 is a logical representation of the functional layers of a computer controlled graphics display system 200 in accordance with the present invention. Aside from the hardware unit 250 and display unit 105, the remainder of the elements of FIG. 3 are implemented as executable instructions within computer system 112 (FIG. 2) and can reside in RAM 102, ROM 103, storage 104 and during operation, a portion of HDGL 240 can also reside in code cache 102a. High level application 210 (e.g., a simulator, a design tool, a multi-media application, a medical imaging application, a game, etc.) includes routines that require generation of images on display screen 105. The images are composed of graphics primitives (points, lines, polygons, shaded polygons, blended polygons, etc.). The routines of application 210 access graphics rendering procedures of high level graphics libraries 220 (3D-DDI) and/or 230 (OPEN GL) by requesting that certain graphics primitives be displayed and supplying hardware independent graphics structures representing the graphics primitives. In the past, although these graphics libraries 220 and 230 used hardware independent inputs, their outputs were hardware dependent, requiring specialized implementations for each hardware unit 250 supported. The use of hardware dependent procedures of graphics libraries 220 and 230 is well known in the art. 3D-DDI 220 and OPEN GL 230 are exemplary and operate with a number of computer systems including PC compatibles and UNIX computers.

According to the present invention, the graphics rendering procedures of the graphics libraries 220 and 230 and their input and output data structures are hardware independent. These high level libraries 220 and 230 interface with the low level hardware dependent graphics library (HDGL) 240 that is specific to the graphics hardware unit 250. The graphics hardware unit 250 can be a graphics accelerator circuit board, an embedded integrated circuit, or a circuit subsystem within a special purpose computer system or the like. A hardware independent communications interface 240a is utilized to provide the required communication link between the high level graphics libraries 220, 230 and the HDGL 240. Any of a number of well known communication interfaces can be used for interface 240a in accordance with the present invention.

A variety of different graphics hardware units 250 can be used within the scope of the present invention. In accordance with the present invention, the HDGL 240 is readily adaptable to accommodate these different hardware unit 250 while requiring little or no change to the high level hardware independent graphics libraries 220 and 230.

The HDGL 240 of FIG. 3 includes a set of hardware dependent low level procedures that interfaces with the high level graphics libraries 220 and 230 that include a set of hardware independent graphics rendering procedures. The interface uses structured, but hardware independent, input data formats. The output data format of the HDGL 240 is hardware dependent and is specific for the hardware unit 250. The procedures of the HDGL 240 are implemented at a very low level (e.g., close to the hardware unit 250) and therefore need to support only a limited number of operations. Since the HDGL 240 is low level, it can readily be redesigned for implementation with a variety of different hardware units 250 or redesigned for implementation with a particular graphics hardware unit in lieu of the complex task of redesigning the higher level graphics libraries 220 and 230 (as done in the past). Since the graphics libraries 220 and 230 contain graphics rendering procedures that are hardware independent, in accordance with the present invention, these libraries do not require redesign or rewriting for each applicable hardware unit 250.

Under the present invention, high level graphics libraries 220 and 230 rely on the HDGL 240 of the present invention to perform the hardware specific functionality required for image rendering. In this way, the computer controlled graphics system 200 of FIG. 3 is readily adaptable to a variety of different hardware units 250 by modification of the reduced complexity (low level) HDGL 240 and requires no modification of high level libraries 220 and 230. Alternatively, a number of different HDGLs 240 can be included within system 200, each different HDGL 240 being specific to a particular hardware unit 250. In this alternative embodiment, the present invention allows a user the select a particular hardware unit 250 for use, and the proper HDGL corresponding to the selected hardware unit 250 is automatically utilized by system 200.

In compiling and linking of application 210, the required procedures of libraries 220 and 230, and the procedures and other required elements of HDGL 240 are linked to produce the executable form of application 210.

Figure 4:
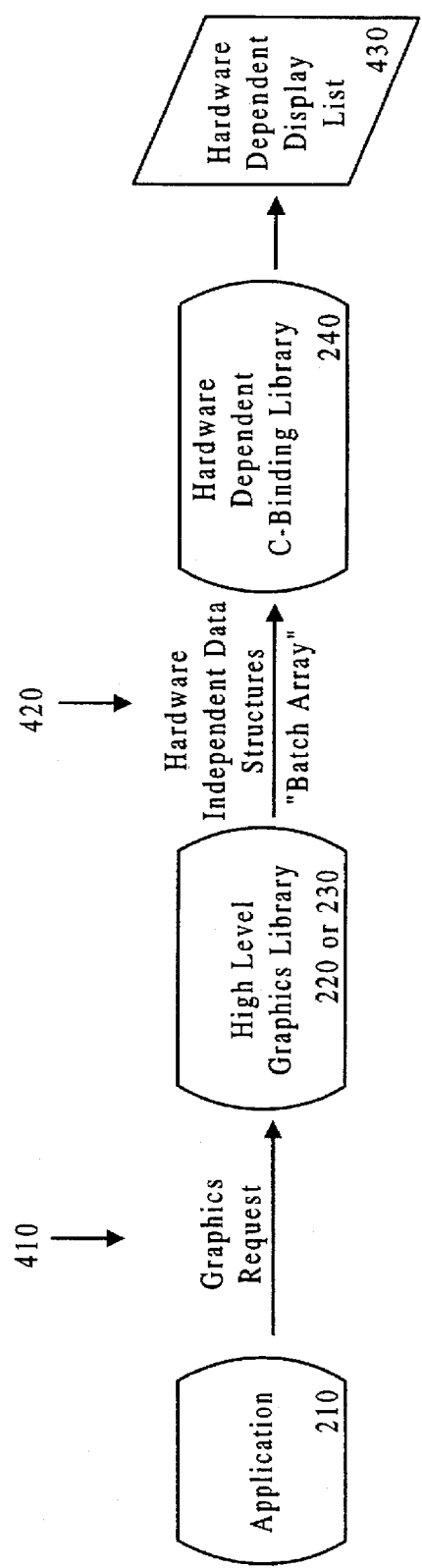
FIG. 4 is a data flow diagram and illustrates components of the computer controlled graphics display system of the present invention including different layers and graphics data/information flow between the layers.
Figure 7:
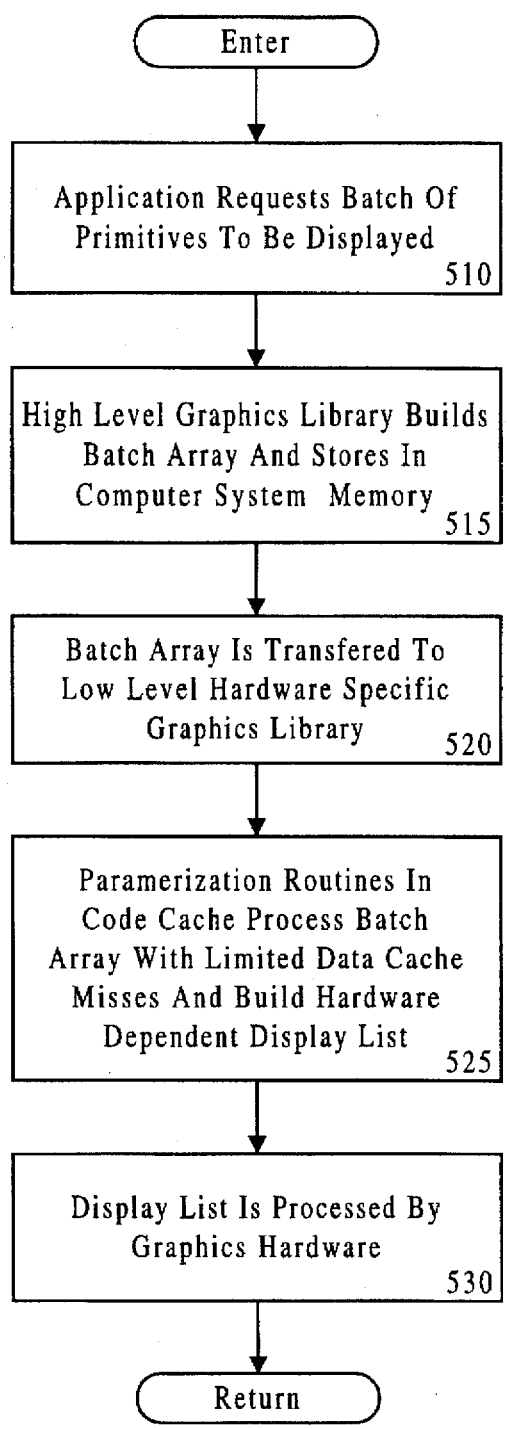
FIG. 7 is a process flow diagram of a process of the present invention for efficiently rendering graphics primitives on a display screen using an array of batch cells.

FIG. 4 is a data flow diagram and illustrates the pertinent data flow between layers of the present invention computer controlled graphics display system 200 for generating an image on the display screen. The process flow associated with the data flow is illustrated in FIG. 7 and is described separately further below.

With reference to FIG. 4, the high level application 210 generates a hardware independent graphics rendering request ("graphics request) including a data structure representative of a graphics primitive or image for display. This hardware independent data structure 410 can include data for rendering an individual graphics primitive or other graphics rendering command, such as bit level transfers (BLT) or fills. The data structure 410 can comprise a single primitive or a plurality of primitives and/or commands. A single hardware independent data structure 410 can be passed to the high level graphics libraries 220 or 230 at one time or many individual requests can be passed at once in an array format to library 220 or 230.

Figure 6:
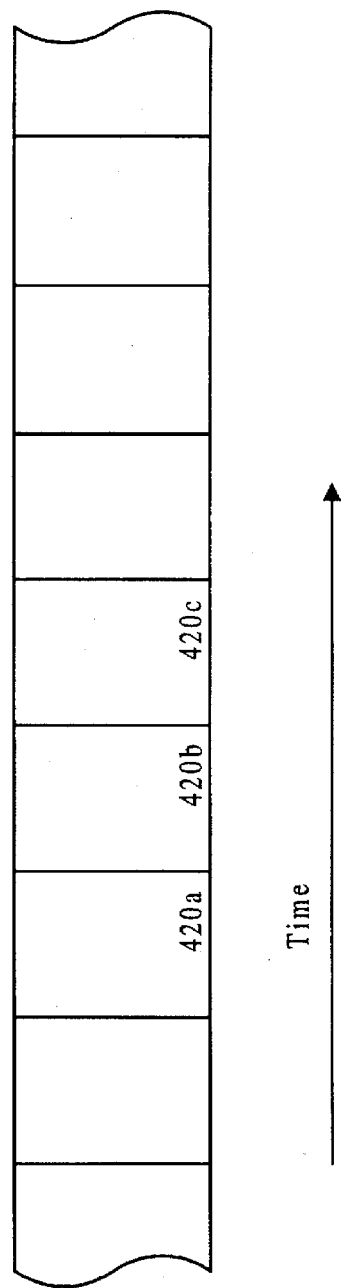
FIG. 6 is a logical representation of a batch array in accordance with the present invention.

The high level graphics library 220 or 230 receives hardware independent data structures 410 for each graphics request and collects them until a group of data structures 410 is received from application 210. The size of the group is variable and is determined based on the allowable size of the batch array 420 which is generated by the high level graphics libraries 220 or 230 in response to the data structures 410. A batch array 420, as shown in FIG. 6, is hardware independent and includes a sequence of batch cells, e.g., 420a, 420b, 420c, etc. Each batch cell represents at least one graphics primitive to be generated and/or a graphics rendering command to be performed and contains an operand and a set of data associated with the operand. The number of batch cells within a batch array 420 is variable and can be programmed by the user. Once a particular number of batch cells, e.g., x, is determined, the high level graphics library 220 constructs a particular batch array 420 in memory 102 (FIG. 2) until x batch cells are met or until some other time critical point is reached.

Referring to FIG. 4, once the batch array 420 is constructed in memory (e.g., 102), it is transferred to the hardware dependent HDGL 240 of the present invention. The HDGL 240 sequentially processes the cells of the batch array 420. For each cell, the hardware independent data structure and operand of the batch cell are translated into hardware dependent microinstructions which are added to a hardware dependent display list 430. Display list 430 is also stored in memory (e.g., 102). The microinstructions within the display list 430 are used by the hardware unit 250 for rendering the graphics primitives and/or graphics rendering commands onto the display screen 105. By processing graphics commands and primitives originated by application 210 on a batch array basis, the hardware specific rendering procedures of the HDGL 240 of the present invention efficiently utilize data and code cache resources available within the present invention system 200.

Figure 5:
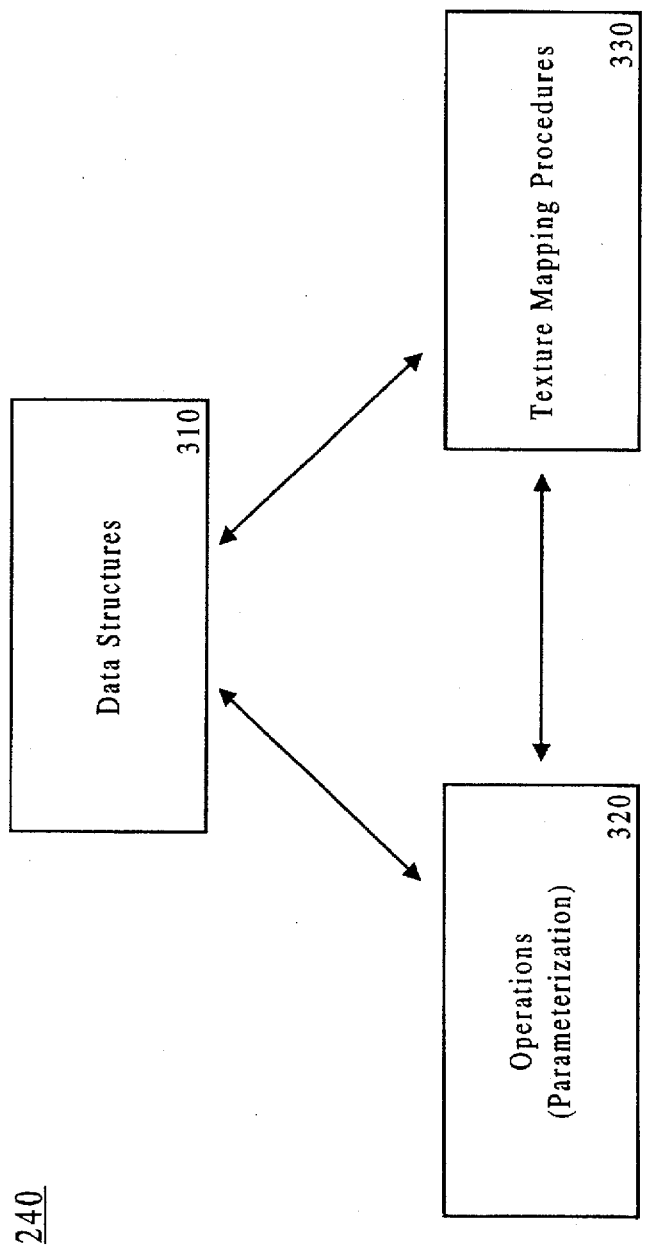
FIG. 5 illustrates components of the low level hardware dependent graphic library (HDGL or "binding" library) of the present invention.

FIG. 5 is a logical block diagram illustrating major components of the HDGL 240 of the present invention. The HDGL 240 includes a set of low level procedures (blocks 320 and 330) used in combination with associated data structures (block 310) that directly interface with the hardware unit 250 by generating microinstructions within a display list in memory (which can reside within system 112 or can be dedicated within the hardware unit 250). HDGL 240 receives graphics information (hardware independent) from the high level graphics libraries 220 and 230 regarding a graphics image or images to be rendered and generates therefrom a hardware dependent display list passed to hardware unit 250 and used to render the images on display 105. The graphics information received by HDGL 240 to produce the graphics image is typically in the form of defined graphics primitives and graphics commands. The display list generated by HDGL 240 is a list of microinstructions that are hardware dependent and are used by hardware unit 250 in rendering the primitives to create the graphic image.

With reference to FIG. 5, the data structures 310 of HDGL 240 include input structures for receiving graphics primitive data in a particular hardware independent format as specified within the present invention and for receiving other operands and texture maps. Block 320 comprises a set of operations or "parameterization" that are performed by the HDGL 240 to transform hardware independent graphics commands and primitives into hardware dependent display list microinstructions. As will be discussed further below, the input graphics commands and primitives are stored in batch cells. Block 320 also includes procedures for adjusting rendering quality and rendering performance of system 200. Block 330 includes texture mapping procedures for registering (e.g. translating), loading, and displaying texture maps. Registering procedures of block 330 are used to translate texture map data between formats that index into a color pallet and formats using RGB-alpha data. An exemplary implementation of HDGL 240 is presented in Section II.

FIG. 7 is a flow diagram of logic blocks a rendering process 500 in accordance with the present invention HDGL 240. It is appreciated that process 500 is implemented within a computer system such as exemplary computer system 112.

At logic block 510, the high level application 210 requests that a graphics primitive and or operation or group of primitives and/or graphics rendering operations be performed. Data structures 410 representing these requests are supplied from application 210. The high level application 210 can request a primitive at a time or the request can be composed of a number of individual primitives and/or graphics rendering operations requested over a period of time. The format of the graphics rendering requests made during block 510 are hardware independent.

Figure 8A:
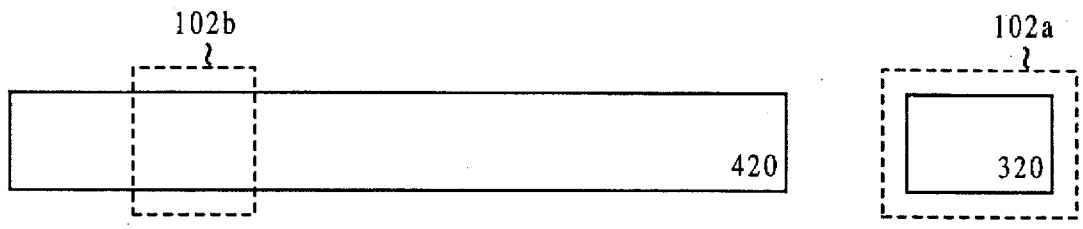
FIG. 8A illustrates contents of a data cache memory and contents of a code or instruction cache memory during a first phase of processing a batch array in accordance with the present invention.

At logic block 515, hardware independent graphics rendering procedures of the high level graphics libraries 220 or 230 receive the primitives and/or graphics rendering operations and construct a batch array 420 based on a single request or based on a number of sequentially received requests from block 510. Depending on the allowable size of the batch array 420, several individual batch arrays 420 can be required to process the requests received from block 510. The batch array 420 is stored in memory 102 and the last batch cell of the batch array 420 is marked as a "batch end" cell. A portion of the constructed batch array 420 is stored in data cache 102b as shown in FIG. 8A. If the batch array 420 is small enough, the entire batch array 420 can fit within the data cache memory 102b. Although a number of different memory sizes can effectively operate with the present invention, an exemplary size of data cache memory is on the order of 8 or more kilobytes. The batch format of batch array 420 is hardware independent.

At logic block 520 of FIG. 7, the batch array 420 is transferred to the HDGL 240 of the present invention. Within the present invention, an actual memory transfer is not required for step 520, instead a pointer can be transferred to the HDGL 240 indicating the starting memory location of the batch array 420 in shared memory 102. At logic block 525, the parameterization routines (block 320 of FIG. 4) of HDGL 240 are used to individually process each batch cell of the batch array 420 to produce hardware specific microinstructions which are added to a display list 430 in computer memory (e.g., memory 102 or other memory directly accessible by hardware unit 250). The parameterization routines operate in loop fashion, uninterrupted, on the entire batch array 420 until the "batch end" is encountered. The parameterization routines 320 are configured such they fit entirely within the code cache memory 102a as shown in FIG. 8A.

Figure 8B:
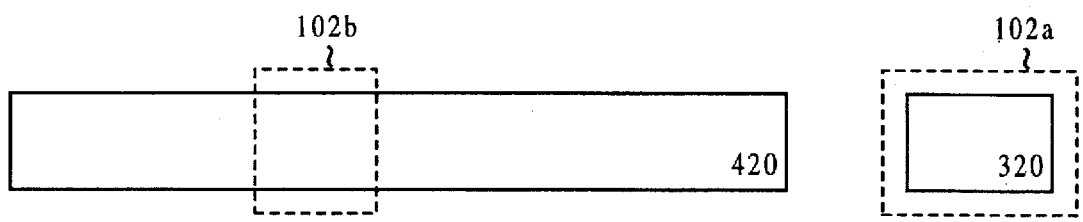
FIG. 8B is an illustration of contents of a data cache memory and contents of a code or instruction cache memory during a second phase of processing a batch array in accordance with the present invention.
Figure 8C:
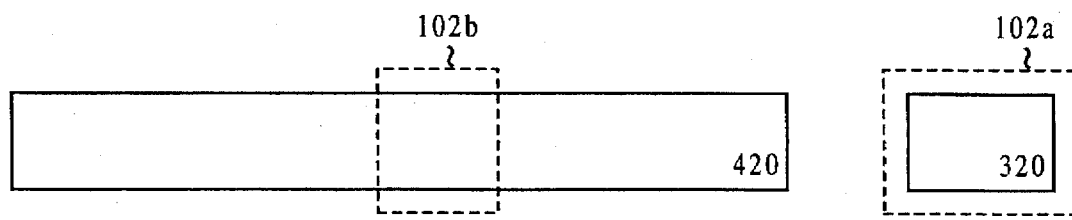
FIG. 8C illustrates contents of a data cache memory and contents of a code or instruction cache memory during a third phase of processing a batch array in accordance with the present invention.

In FIG. 8A, since a number of batch cells within batch array 420 are within data cache 102b and since the parameterization procedures 320 of HDGL 240 are within the code cache 102a, the present invention provides an efficient processing mechanism for these batch cells since no data cache or code cache misses are encountered for the data shown in FIG. 8A. In other words, according to the present invention, most of the data and all of the required code to perform parameterization are located in cache memory. While these batch cells within cache 102b are being processed, the display list 430 is constructed as representative microinstructions are added to the display list 430 for each batch cell by the parameterization procedures 320 of HDGL 240. As illustrated by block 525 of FIG. 7, when the batch cells of memory cache 102b are completely processed by HDGL 240, the present invention loads another group of batch cells into data cache 102b, as shown by FIG. 8B, and this group is again efficiently processed by parameterization procedures 320 without data or code cache misses. As shown by FIG. 8C, the process is repeated for yet another group of batch cells of batch array 420.

The process 525 of FIG. 7 is repeated until a batch end cell is encountered in batch array 420. At this time, the hardware dependent display list 430 is considered complete. At logic block 530, the display list 430 is transferred to hardware unit 250 for rendering. Within the present invention, an actual memory transfer is not required for step 530, instead a pointer can be transferred to the hardware unit 250 indicating the starting memory location of the display list 430 in shared memory 102. At block 530, the microinstructions of the display list are processed by the hardware unit 240 and a bitmapped image is generated on display screen 105 and maintained by a frame buffer or other video memory until modified or overwritten. While the hardware unit 250 is processing the display list 430, the processor 101 is free to process instructions of the application 210.

By processing a batch array 420 of graphics primitives and/or graphics rendering operations through the HDGL 240 of the present invention, data and cache memories 102b and 102a are efficiently utilized to store and supply needed instructions and data to process sequential batch cells. Using this method, few data cache misses and no code cache misses are encountered during parameterization (e.g., block 525).

Rendering Quality/Performance Adjustment. The present invention HDGL 240 further allows user selectable adjustments that alter the level of rendering performance (e.g., speed) performed by HDGL 240 and correspondingly alter the level of image quality rendering as well. Specifically, the HDGL 240 provides a user adjustable performance/quality control panel shown in FIG. 9A. The performance/quality control panel 610 or "dial" is displayed on screen 105 by the present invention. The panel 610 has a user adjustable setting indicator 615 that can be altered by keyboard control via unit 106 or by a cursor 107 or similar screen interface. The setting indicator 615 can be adjusted along the dial 610 to alter the quality setting as indicated by portion 610a which also correspondingly alters the performance setting as indicated by portion 610b. Dial 610 indicates minimum and maximum settings for quality and performance (in one embodiment a scale of 0 to 255 are used which represent the decimal ranges of an eight bit number). Other dial formats can also be used (e.g., circular, etc.).

Figure 9A:
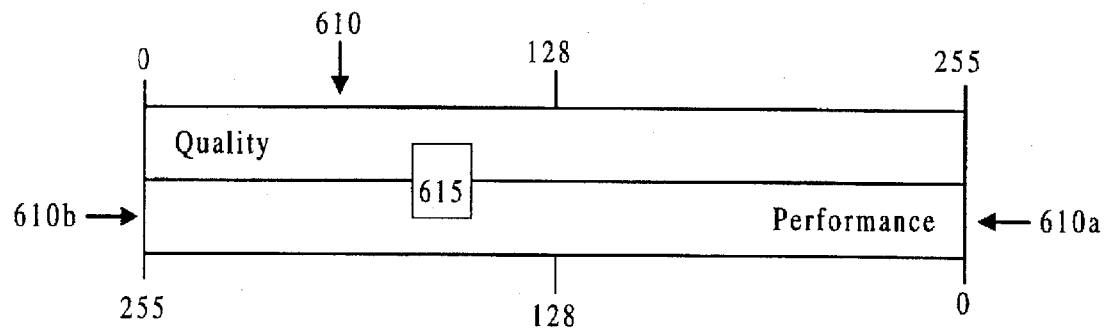
FIG. 9A illustrates a quality/performance control panel in accordance with the present invention.

The quality and performance minimum and maximum settings of FIG. 9A are order reversed to illustrate the inverse relationship between the two characteristics. According to the dial 610, as rendering quality is increased, the user desires image quality or rendering quality to increase. This action will automatically reduce the rendering performance value since the graphics system 200 will require more processing time to achieve the desired image quality. Conversely, as rendering performance is increased, the graphics system 200 reduces the level of image quality in order to process the graphics information faster through the hardware unit 250. With reference to an exemplary embodiment, Section II illustrates the procedure SetQualityDial that is used to input the setting 615 value.

Figure 9B:
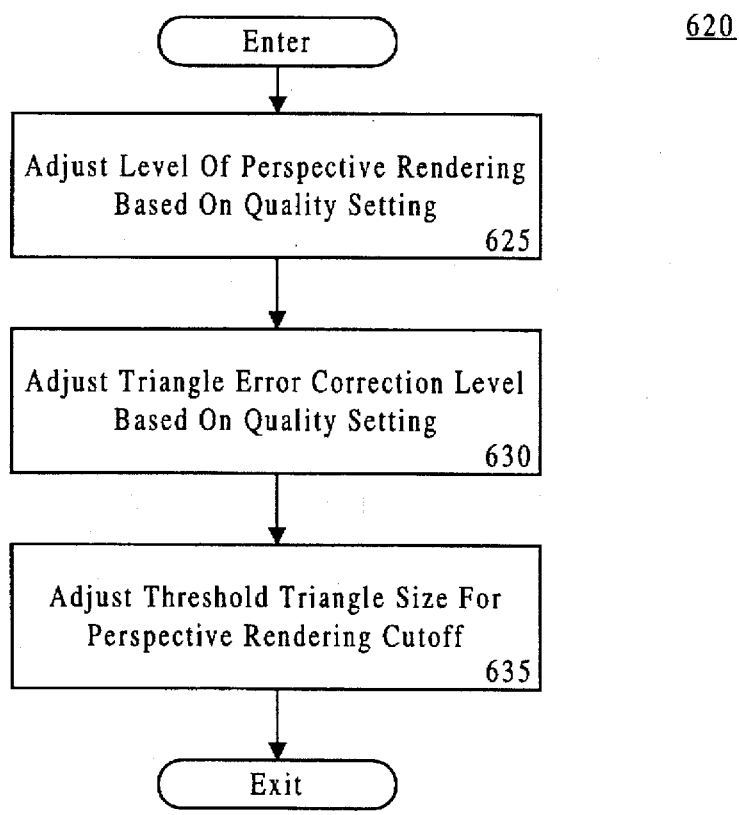
FIG. 9B is a flow diagram of a process of the present invention for adjusting rendering quality vs. rendering performance based on setting of the quality/performance control panel.
Figure 10A:
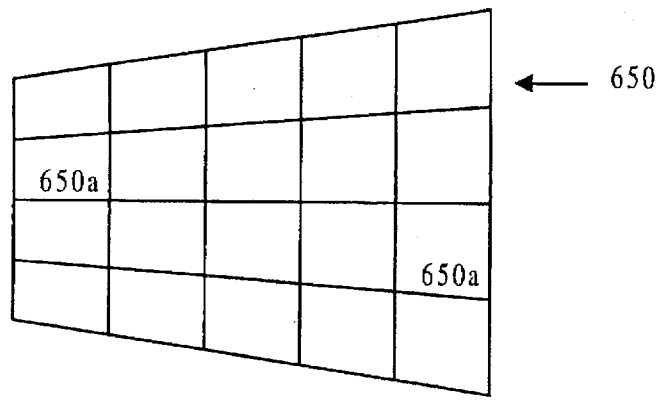
FIG. 10A is a graphic representation of a graphic element subdivided using linear subdivision.
Figure 10B:
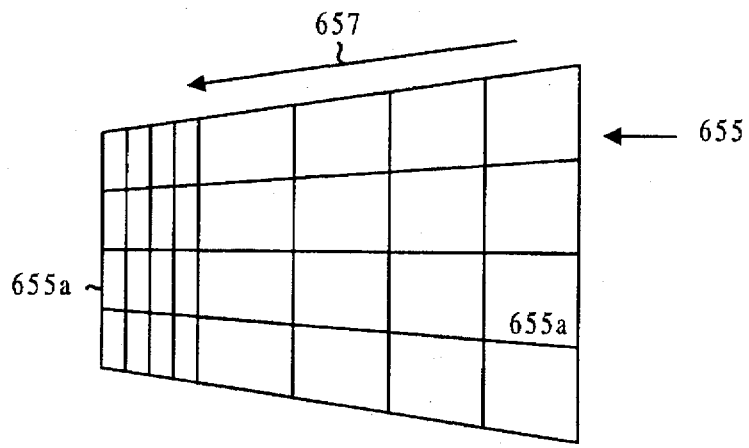
FIG. 10B is a graphic representation of a graphic element subdivided using perspective subdivision.

The logic process 620 of FIG. 9B illustrates the processing of the HDGL 240 that responds to the settings 615 in the quality/performance control panel 610 of FIG. 9A. Process 620 is implemented using a computer system of the kind illustrated in FIG. 2. Logic block 625 adjusts the level of perspective rendering of graphic images based on the placement of setting indicator 615. As shown by FIG. 10A, a graphic element 650 can be subdivided into subdivisions 650a based on a linear model. Linear subdivision is not computationally time consuming and allows high performance rate processing of system 200 for good rendering performance. However, as shown in FIG. 10B, a graphics element 655 can also be subdivided based on a perspective model which better illustrates the element's three dimensional orientation on the screen 105 as compared the linear model. FIG. 10B illustrates that the subdivisions 655a are not made linearly but are based in part on the three dimensional orientation of the element 655 and are graduated (to show perspective) based on the depth dimension (e.g., Z axis 657) of the element 655. Perspective subdivision renders a higher quality graphic image but is computationally intensive and reduces rendering performance rate.

Process 625 of FIG. 9B reduces the amount of perspective subdivision and increases the amount linear subdivision as the setting indicator 615 is moved to increase rendering performance rate. Likewise, process 625 increases the amount of perspective subdivision and decreases the amount linear subdivision as the setting indicator 615 is moved to increase rendering quality. Any of a number of functions can be used in accordance with the present invention to arrive at the degree of perspective/linear subdivision based on a given setting 615. In one embodiment, a threshold determination is performed where if setting 615 is over the halfway point in performance (610b) then all subdivision is linear and if setting 615 is over the halfway point in quality (610a) then all subdivision is perspective. In other embodiments, the degree or number of linear subdivisions is incrementally increased at the expense of the degree of perspective subdivisions as performance rate is increased and with the reverse occurring as quality is increased.

Figure 10C:
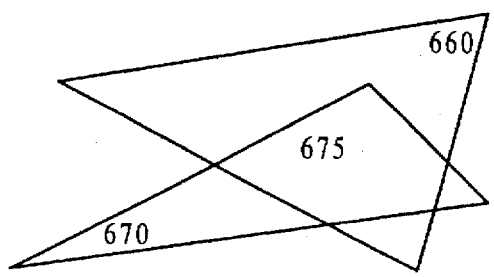
FIG. 10C illustrates an overlap region between two triangle polygons.

Logic block 630 of FIG. 9B adjusts polygon (e.g., triangle) error correction factors based on the setting 615. As shown in FIG. 10C, when two triangles 660 and 670 overlap in area 675, a special procedure for computing error correction factors or terms is used to accurately render the overlap area 675. This error correction procedure and the error correction factors used by the present invention is described in U.S. patent application Ser. No. 08/299,739, attorney docket number 984128 U.S., entitled "Incremental Orthogonal Error Correction for 3D Graphics," filed Sep. 1, 1994, by Thomas Dye, and assigned to the assignee of the present invention. According to block 630, if setting 615 indicates a higher rate of performance, then the present invention 240 reduces or eliminates the amount of error correction factors computed and used by the above process. In this situation, the triangles 660 and 670 are rendered with less image quality but with good rendering performance rate. Alternatively, if setting 615 indicates more image quality, the present invention HDGL 240 increases or maximizes the amount of error correction factors computed and used by the above process. In this situation, the triangles 660 and 670 are rendered with better image quality but with a lower rate of performance.

Logic block 635 of FIG. 9B controls the threshold size setting of a primitive used to cut off perspective rendering. That is, the image quality of primitives of certain small sizes does not benefit greatly from perspective rendering techniques due to their reduced size. A threshold size is maintained by the HDGL 240 that cuts off perspective rendering for all primitives below the threshold size. As the performance/quality setting 615 (FIG. 9A) is set for a higher image quality, the threshold size maintained by block 635 of the present invention is decreased so that most primitives are displayed using perspective rendering techniques. As the performance/quality setting 615 (FIG. 9A) is set for higher rendering performance rate, the threshold size maintained by block 635 of the present invention is increased so that progressively larger graphics primitives or images are not displayed using perspective rendering techniques to increase performance. Any of a number of functions can be used in accordance with the present invention to arrive at the threshold cut off size based on a given setting 615.

Texture Map Format Translations. The HDGL 240 of the present invention also provides translation between texture map formats in order to register texture information ("a texture"). In an exemplary embodiment, two texture formats are used in the computer system implemented translation procedure 700 of FIG. 11 of the present invention. One format is the RGB-alpha format where each pixel is given a red, green, blue and alpha value. A second format is an index format where each pixel is given an index value into a color palette. The default format depends on the format adopted by the hardware unit 250. Either of the above formats, or any other format, can be the default format. Procedure 700 illustrates an exemplary embodiment where the RGB-alpha format is default.

According to process 700, at logic block 705 the HDGL 240 receives an original texture information in a particular texture format. This original texture information or data is placed into memory 102. At logic block 710, the present invention checks a predetermined flag to determine if the texture information is in the index format (e.g., indexed into a particular color palette). If so, processing continues to logic block 715 where the texture data is translated from index format to RGB-alpha format. At block 715, for each pixel of the texture data, the index value is used to obtain the particular color attributes from a color palette for that pixel. Once the color attribute is found, its red, green, blue, and alpha values are determined and recorded in an RGB-alpha format. The resultant texture information is then saved into a new location in memory 102 or into the same location as the original texture information (e.g., overwriting the original texture information). Processing then flows to block 720.

At block 710, if the index format was not index mode, then it is assumed that the format is RGB-alpha. By the time processing flows to block 720, the texture is said to be registered. Processing then flows to logic block 720 wherein the texture information is transferred and allocated for use by the parameterization procedures 320 of the HDGL 240. Depending on the hardware unit 250, this involves loading the texture from memory 102 (system memory) to a memory 102' directly accessible by (and typically within) the hardware unit 250. The registered texture information can then be displayed by a number of polygon rendering operations recognized by the present invention, as illustrated in the embodiments described in Section II.

Figure 11:
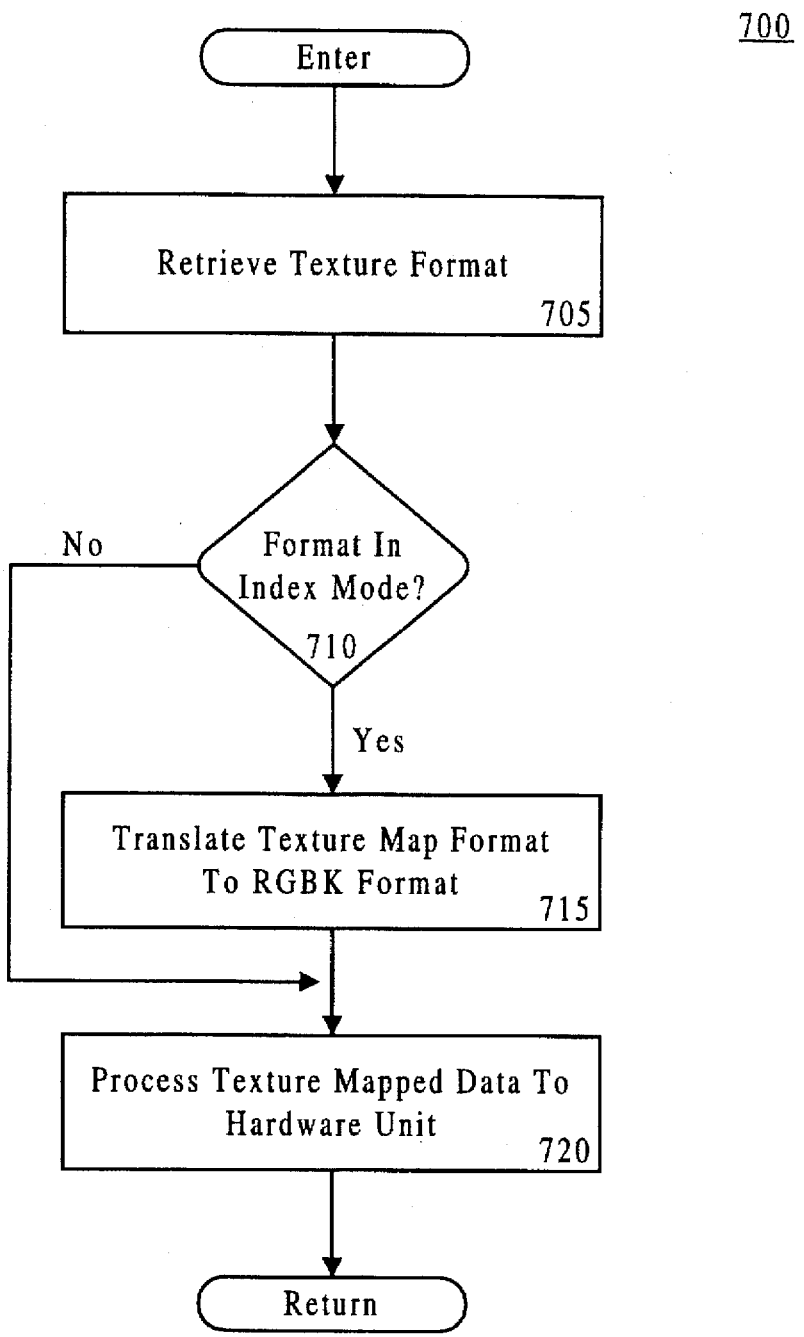
FIG. 11 is a flow diagram of a process of the present invention for translating between color modes for texture maps.

It is appreciated the translation process 700 shown in FIG. 11 is also performed for any graphics information for display apart from texture information. For instance, vertices associated with primitives can be specified in either index or RGB-alpha formats and the present invention translates between the two formats depending on the given default (see Section II below for a particular description).

Figure 12:
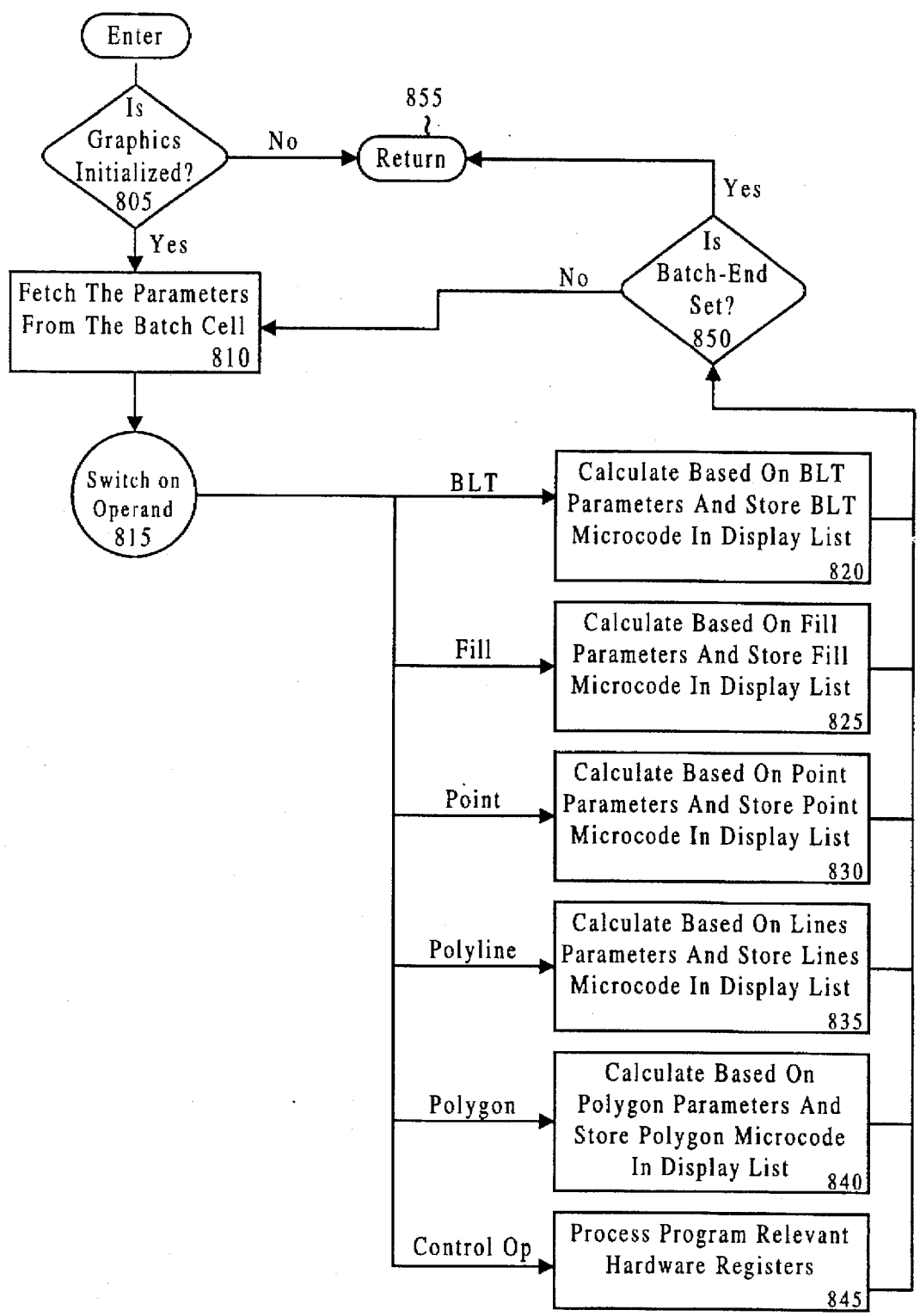
FIG. 12 is a flow diagram of a hardware dependent process of the present invention for building a display list based on graphics data/information stored in a batch cell of a batch array.

Parameterization. FIG. 12 illustrates a flow diagram of a computer implemented logic procedure 800 of the HDGL 240 used to interrogate a batch cell of batch array 420 and perform parameterization thereon to construct microinstructions for the display list 430. Process 800 corresponds to process 525 of FIG. 7. A particular implementation of procedure 800 is referred to below in Section II as BuildDisplayList. Process 800 starts at logic block 805 where the present invention checks if the graphics procedures are initialized (e.g., a check is made if InitGraph was executed), if not, processing ends via logic block 855. If graphics are initialized, then processing flows to block logic 810 where a batch cell of the batch array 420 is obtained and the parameters from the batch cell are interrogated. In one embodiment (illustrated in Section II below), each batch cell contains an operand field, a number field indicating a number of vertices associated with the data in the cell, a flag field, and data structures (or a pointer thereto) for each vertex (e.g., color attributes, coordinates, etc.). The operand field defines a primitive to be rendered or a graphics command or operation to be performed.

Depending on the operand of the cell, one procedure of 820–845 is called by switch logic block 815. The process of reading the parameters of the batch cell and generating microinstructions therefrom for placement into the display list 430 is called "parameterization" and is performed by logic blocks 820–845. If the operand indicates a BLT, then a bit level transfer is performed by logic block 820 between a first screen area and a second screen area. The first screen area is identified by two corner coordinates (first and second vertex) and the second screen area is identified by one coordinate (third vertex). The pixels within the first coordinate are then copied into the second coordinate by the BLT operation. Based on the flags field, a texture information can be used as the source of the transfer. Also, a second flag setting will synchronize the transfer with a screen update. Based on the BLT operation, the present invention HDGL 240 generates the appropriate microinstructions within the hardware dependent display list 430.

If the operand from block 815 is a FILL operand, then logic block 825 is executed where a screen area specified by two corners (first and second vertex) will be filled with a specified source of information. The color selected for the fill originates from the color attribute set in the first vertex data structure. If Z-buffering is set in the batch flag, then the Z-buffer is filled with a value defined in the numbers field. Based on the FILL operation, the present invention HDGL 240 generates the appropriate microinstructions within the hardware dependent display list 430.

If the operand from block 815 of FIG. 12 is a POINT operand, then logic block 830 is executed to generate microinstructions in the display list 430 to display a number of points that are defined in the vertex data structures while the number of points to be processed is indicated in the numbers field. Based on the POINTS operation, the present invention HDGL 240 generates the appropriate microinstructions within the hardware dependent display list 430.

If the operand from block 815 is a POLYLINE operand, then logic block 835 is executed to generate microinstructions in the display list 430 to display the line or series of lines defined by the batch cell. The points comprising the line or lines are defined by the vertex data structures and the number of points is defined in the numbers field. There are three line rendering modes supported, list, strip or fan and the mode is set in the flag field. In list mode, a set of independent lines is rendered with each vertex pair representing the end points of each line. In strip mode, the second line is appended onto the end point of the previous line. The first line is defined by a pair of vertices and each line thereafter is defined by a single vertex. In fan mode, the first vertex defines one point used for all lines (a common point) and each vertex thereafter defines a line from the first vertex to that point. In each of the above modes, the numbers field specifies the number of vertices in the polyline operation. Based on the POLYLINE operation, the present invention HDGL 240 generates the appropriate microinstructions within the hardware dependent display list 430 for the processed batch cell.

If the operand from block 815 is a POLYGON operand, then logic block 840 is executed to generate microinstructions in the display list 430 to display the polygon primitive or series of polygons defined by the batch cell. The number of vertices specified in the batch cell is indicated in the numbers field. There are three polygon rendering modes supported, list, strip or fan and the mode is set in the flag field. In list mode, every three vertices define a polygon. In strip mode, the first three vertices define a first polygon and each vertex thereafter defines a new polygon sharing two vertices from the previous polygon. In fan mode, the first vertex in the vertex data structure is shared by each polygon and every two vertices thereafter defines a new polygon. Based on the POLYGON operation, the present invention HDGL 240 generates the appropriate microinstructions within the hardware dependent display list 430 for the processed batch cell.

If the operand from block 815 is a control operand, then logic block 845 is executed to process the control operand. For example, the control operand SaturatetoBounds sets certain color control registers high and low to the values of the first and second byte in the numbers field for color masking and saturation. The SetZMask operand sets the Z mask for collision detection and object identifying to the value of the numbers field. The SetDisplayPage control operand sets the beginning offset of the display region. This is used for double and triple buffering. The offset value is passed in the numbers field. As described in Section II, other control operands are allowable.

After logic blocks 820–845 complete, they return to block 850 where the flag field of the processed batch is tested to determine if it contains a Batch_End flag. If so, the batch array 420 is complete and execution exists via block 855. If the Batch_End flag is not set, then processing returns to block 810 to fetch and process the next batch cell of the batch array 420. The display list generated by the processing of FIG. 12 is rendered on display unit 105 when system 200 receives a flush display list command (see Section II for an exemplary embodiment).

The instruction set required for process 800 is compact enough to fit within most code cache memory 102a of most computer systems. In this way, the execution of an batch array 420 of batch cells through process 800 does not cause code cache misses and the parameterization process 800 is rapidly executed. By sequentially executing batch cells within an batch array 420 without interruption, data cache 102b usage is also maximized during parameterization.

SECTION II

A purpose of the HDGL 240 is to provide readily adaptable hardware dependent interface for the hardware independent graphics libraries 220 and 230. It is expected that different versions of the developed, can be developed, at low level, to operate with a variety of different hardware units. Alternatively, a set of HDGLs can be provided with a number of hardware units with the user having the ability to select between the set. An exemplary implementation of one HDGL 240 version is shown below. Although a number of alternative embodiments can be realized within the scope and spirit of the present invention HDGL 240, the exemplary implementation is presented below modeled under the "C" language. Specifically, exemplary implementations for the data structure block 310 and the operations block 320 of HDGL 240 of FIG. 4 are given. One skilled in the art can utilize specific structures and procedures with HDGL 240 which will provide the desired result.

EXEMPLARY HARDWARE DEPENDENT GRAPHICS LIBRARY DATA STRUCTURE 310

The following basic field types are defined:

| | |
|---|---|
| int | 32 bit signed integer |
| DWORD | 32 bit unsigned integer |
| WORD | 16 bit unsigned integer |
| BYTE | 8 bit unsigned char |
| FIX | 32 bit fixpoint number with 16 bits of |
| integer | and 16 bits of fraction. |
| BOOL | true (1) / false (0) integer |

The HDGL 240 functions as a parameterization layer where the high level description 420 of the graphics primitives (points, lines, etc.) are being processed and the hardware level code is being generated and stored in a display list 430. HDGL's input batch array 420 is defined as an array of Batch structures. Each batch cell contains at least one Batch structure. An exemplary Batch structure (e.g. for a batch cell of batch array 420) is presented below.

| Batch | |
|---|---|
| DWORD | dwOp, |
| DWORD | dwFlags, |
| DWORD | dwN, |
| WORD | wTexID, |
| Vert* | pVert; |

The above Batch structure is a prototype a for batch cell. Value "dwN' defines the number of points of vertices in the primitive associated with the Batch structure. 'dwOp' determines the basic graphics operation performed by the Batch structure and can be one of the following:

1. 2D Operations: Operand BLT copies a rectangular area defined by the first two vertices; e.g., the first vertex defines the top-let corner, the second vertex defines the bottom-right corner (inclusively). The destination for the area is defined by the third vertex in a Batch Structure of a batch array by its top left coordinate. If a flag TIMED_BLT is set, the BLT operation that is being performed will be triggered by the video refreshing of the line number stored in dwN field of the cell. If TEXTURE is present in the flags, the texture number dwN will become the source of the BLT operation. Operand FILL sets the color or other attribute of a rectangular area of the screen. The area is defined by the first two vertices; e.g., the first vertex defines the top-left corner, the second vertex defines the bottom-right corner (inclusively). If Z buffering is set within dwFlags, then the Z buffer will be filled with the value from dwN field (e.g., low 16 bits). That normally is set to 0xFFFF in one implementation. The color values that fill the frame buffer (e.g., a memory unit shared or accessible by hardware unit 250) are taken from the first vertex color fields. The FILL operand recognizes fills with zero and sets the fast clear operation as supported by the hardware unit 250.

2. 8D Operations: The POINT operand renders a set of points whose coordinates are pointed to by a vertex array. The number of points is defined in the dwN field. The POLYLINE operand renders a polyline primitive consisting of up to (dwN-1) vertices. The POLYGON operand renders a polygon primitive based on dwN number vertices. The exact type of polygon is specified via a POLY* flag.

3. Graphics Rendering Control Operations: The SATURATE_TO_BOUNDS operand sets color compare registers high and low to the values of the first (1 sb) and the second byte in 'dwN' in the range of 0 to 255, in one embodiment. This is used in color masking and saturation procedures. The SET_Z_MASK operand sets the Z_mask for collision detection and object identification to the value (e.g., low 16 bits) of dwN. The under laying principle of object identifying is to set aside several upper bits of Z coordinate to hold the object identification number. In one embodiment, this partition is hardware protected by setting their bits to zero while leaving the rest to be one. Later during the collision detection, Z value that has collided is examined for that bit string to show the identification of the object being collided. The SET_DISPLAY_PAGE operand sets the beginning of offset of the display. This is used for double and triple buffering. The offset is passed in dwN field.

Regarding the Batch Structure, the 'dwFlags' field indicates additional features: The BATCH_END flag is set in the last cell in a batch array 420 to terminate the batch processing. If there is only one batch cell, BATCH_END is set in the dwFlags of the cell. The TIMED_BLT flag is set within the BLT operation to perform timed BLT operation that is synchronized with the specified screen refresh line.

The 'dwFlags' field also indicates the particular polyline primitive and polygon primitive rendering mode to use. Polyline primitives can be multi line and defined as lists, strips, or fans, specifying one of: (1) LINE_LIST, or (2) LINE_STRIP, or (3) LINE_FAN. Polygon primitives can be multi-triangular and defined as lists, strips, or fans, specifying one of: (1) POLY_LIST, or (2) POLY_STRIP, or (3) POLY_FAN. The differences between these rendering modes as described below. A LIST is an ordered set of points which defines polygons (e.g., triangle polygons) by using three points. The first triangle polygon is defined by points; 0, 1,2. The second triangle polygon is defined by points: 3, 4, 5. The third is defined by points: 6, 7, 8 etc. A STRIP is an ordered set of points which uses points 0, 1, 2 as the first triangle polygon. The second triangle polygon is defined by points 1, 2, 3. The third triangle polygon is defined by points 2, 3, 4 etc. A FAN is an ordered set of points which uses point 0 as the center of many triangle polygons. The first triangle polygon is defined as 0, 1, 2. The second triangle polygon is defined by points 0, 2, 3. The third triangle polygon is defined by points 0, 3, 4 etc.

If the operation is to be Z buffered, one of the following flags is added within 'dwFLAGS': (1) ZBUFFER performs normal Z operation; or ZALWAYS writes both pixels and Z; or ZMASK performs normal Z operation, but does not update the Z buffer. In addition, the GOURAUD flag is added to polyline and polygon operations if shading is desired. The ALPHA flag is added to polygon operations for alpha blending, in certain hardware units that support this feature.

The TEXTURE flag texture maps polygons. Such textured polygons can also have PERSPECTIVE added to turn on perspective correction. As discussed further below, the value 'wTexID' represents the texture ID number of the registered texture.

The following flags are used with textures: (1) TEX_MAX_NEAREST, a common default; or (2) TEX_MAX_LINEAR; and one of the following: TEX_MIN_NEAREST, or TEX_MIN_LINEAR, another common default. The flag, TEX_TRANSP, is added for transparent textures. The color that is being treated as transparent is set by the operation SATURATE_TO_BOUNDS as both the low and high value.

Another data structure of HDGL 240 is the Vert structure which defines a vertex for a graphics primitive:

| Vert | FIX | x, y, z; |
| | union c | |
| | BYTE | index; |
| | BYTE | r,g,b,a; |
| | FIX | u, v, w; |

The position in 3D space of the vertex in defined by fields x, y and z coordinates. The color can be recognized among two different formats, either 'index' format (for 8 bpp indexed color mode in one embodiment) or a combination of r, g, b, alpha format specified as components (for 16, 24 bpp color mode in one embodiment). The fields u and v define the coordinate in the texture space and field w is the homogeneous coordinate for texture calculations. For each graphics primitive in a batch cell, an array of these Vert structures is created in memory 102 and the address of the Vert array is passed to the HDGL 240 via the 'pVert' entry in a Batch cell of batch array 420. The structure also facilitates the texture map coordinates (u, v) that are one-to-one mapped to the given screen coordinates. These are used in texture mapping operations. The parameter "w" is the perspective factor of that vertex with its value set to "1" meaning, in one embodiment, that no perspective is assigned to the vertex and any larger value meaning that the texture is more skewed to that vertex causing more perspective distortion.

Another data structure of HDGL 240 is the Texture structure which defines a texture map for registration purposes.

| Texture | | |
| | WORD | wHeapID; |
| | WORD | wWidth; |
| | WORD | wHeight; |
| | BYTE* | pbTex |
| | DWORD | dwFlags; |

This data structure has texture dimension fields (width and height) and a pointer (pbTex) to a texture residing in system memory 102. It also contains the handle (HeapID) to the heap that was allocated for all the textures of one user using the function TextureHeapAlloc( ). The 'dwFlags' field holds the type of the texture and depending on the hardware unit 250, it can be one of the following: (1) TEX_4 BBP for 4 bpp indexed textures, or (2) TEX_8 BBP for 8 bpp indexed textures, or (3) TEX_16 BBP for true color 565 textures, or (4) TEX_24 BBP for true color 888 textures or any other custom setting.

Also, the following flag can be logically added to the 'dwFlags': TEX_PROTECT protects the user texture from being overwritten with its hardware format during texture recognition. For true textures, in one embodiment, the texture data can be written in the a 3D packed format [alpha-BGR] with the red color in the least significant byte, stored linearly from left to right, and stored from top line to the bottom. For indexed 8 bpp, only one byte per pixel is needed, and for 4 bpp, two pixels are packed into each byte, with the pixel to the left of the pair being stored in the upper nibble.

Another data structure of HDGL 240 is the Palette structure which defines a type of a set of palette cells:

| Palette [256] | | |
| | BYTE | r; |
| | BYTE | g; |
| | BYTE | b; |

In one embodiment, this structure defines a type for a set of 256 palette cells by their red, green and blue components.

Another data structure of HDGL 240 is the Rect structure which defines an inclusive rectangular area on the screen:

| Rect | | |
| | WORD | x1; |
| | WORD | y1; |
| | WORD | x2; |
| | WORD | y2; |

In one embodiment, the format(x1,y1) defines the top left corner and (x2,y2) defines the bottom right corner. Another data structure is HDGL 240 is the Init structure:

```
Init
    Word   resolution
    WORD   color_mode;
    WORD   texspace;
```

This structure determines the resolution and color modes to be initialized. It also sets the amount of texture (private) memory that is used to store loaded textures.

Another data structure of HDGL 240 is the DisplayContext structure shows the state of the hardware unit 250 at any point in time:

```
DisplayContext
    WORD   wHardware;
    WORD   wVideoMemory;
    WORD   wTextureHeap;
    WORD   wTextureAvail;
    DWORD  fCapAlpha;
    DWORD  fCapTexture;
    DWORD  fCapZmask;
```

The address of this system wide structure is obtained by calling another initialization procedure. The wHardware field contains the code of the underlying graphics hardware and will return the supported hardware version: (1) HARDWARE_A; HARDWARE_B; HARDWARE_C, etc. The wVideoMemory field shows the amount of video RAM present on the hardware board (including the Z buffer). The wTextureHeap field shows the total amount of memory available for textures and the wTextureAvail field shows the amount of memory available for allocation for textures. This value is equal or less than the wTextureHeap because different users may have already allocated heaps for their textures.

EXEMPLARY HARDWARE DEPENDENT GRAPHICS LIBRARY OPERATIONS 320

A Boolean value is returned by some functions to signal if the function succeeded (TRUE) or failed (FALSE). In the case of a failure, GetErrCode( ) can be called to return the error code of the last error and GetErrMsg( ) can be called to return the pointer to a zero-terminated string describing the last error.

HDGL 240 procedure, InitLib( ), is called in advance of any other procedure to initialize the HDGL 240. Another procedure is the InitGraph procedure:

```
BOOL InitGraph (const WORD wResolution, const WORD wColorMode)
```

This procedure initializes the graphics hardware unit 250 and is called by the system 200 and specifies the resolution and color modes to be initialized. The field 'wResolution' is one of the following: (1) RES_GAME sets the resolution to 640×480; (2) RES_STANDARD sets the resolution to 1024×768. The 'wColorMode' field sets the desired mode within the graphics mode to either: (1) COL_8 for 8 bpp palletized; (2) COL_16 for 16 bpp 5-6-5; or (3) COL_24 for 24 bpp true color 8-8-8.

Depending on the hardware unit 250, valid combinations of the 'wResolution' and 'wColorMode' are: (1) 640×480×8 indexed, db with Y offset 640×480×8 indexed, db with display pointer toggle; (2) 640×480×16 tc, db with Y offset; (3) 640×480×24 tc, db with Y offset; (4) 1024×768×8 indexed; (5) 1024×768×46 tc; and (6) 1024×768×24 tc. This procedure returns TRUE on success, otherwise FALSE.

Possible return errors are: (1) E_MEMTEST hardware unit 250 memory test failed; (2) E_ENGINETEST hardware unit 250 execution test failed; (3) E_PCI either hardware unit 250 or bus 100 is not present; (4) E_REGTEST hardware unit 250 failed internal register test; (5) E_NOTSUPPORTED mode is not supported by current hardware (e.g., 16 bpp on for one particular hardware unit 250); and (6) E_PARAMS invalid parameters to the procedure.

Another procedure within HDGL 240 is the Restore TextMode procedure:

```
RestoreTextMode( )
```

This procedure restores video mode to the VGA text mode (e.g., mode number 3 in one embodiment). This procedure is used as a counterpart to the InitGraph procedure however the state of the hardware unit 250 is undefined after this call.

Another procedure within HDGL 240 is the DisplayContext * QueryGraphhicsDevice procedure:

```
DisplayContext * QueryGraphhicsDevice( )
```

This procedure obtains the address of the system wide display context structure that holds the current information about the state of the hardware unit 250. The SetPalette procedure is another procedure within HDGL 240:

```
BOOL SetPalette (WORD int_palette [,Palette* palette, WORD start, WORD count])
```

This procedure initializes the palette registers to one of the following sets (value of init_palette is): (1) PAL_GREY for gray scale palette; (2) PAL_RGB for simulation of the index color (3-3-2); and (3) PAL_CUSTOM for a custom palette—in this case the third parameter is pasted and is a pointer to a user palette. The arguments 'start' and 'count' define the starting index and the total number of palette cells to be set from the given palette. For the whole palette, it will be 0 and 256 respectively, in one embodiment. The procedure returns TRUE on success, else FALSE, possible errors are E_PARAMS for invalid parameters.

The SetQualityDial procedure is another procedure within HDGL 240:

```
SetQualityDial (BYTE bQuality)
```

This procedure sets a value of the quality/performance control panel to a value in the range [0,225] in one embodiment to adjust rendering performance and image quality. The lower the value is, the faster the parameterizations are, but less precise. If the current frame is an animation step, it is advantageous to set this value to some small number (e.g., less than 100) to achieve better speed. If precision is needed, the value is set to some large value (e.g., above 200).

Parameterization routines are typically implemented with speed as the most significant factor. However, this approach sacrifices rendering quality. To achieve a proper balance, the adjustment 'quality' has been introduced. With it set to zero, the rendering routines will use the highest performance rate approach which is not always the most graphically precise. By increasing this value up to the maximum, precision will be increased at the expense of some loss of performance rate. The precision reflects the error terms in Z and color calculations as well as graphics primitive overlap areas, depending on the hardware unit 250. With texture mapping, the following heuristic is used: if texture is perspective corrected and the vertical size is 'small' or the difference in Z is 'small', the texture will be drawn in linear rather than perspective to speed up the parameterization step.

The procedure that reads the hardware independent batch cells of batch array 420 and builds corresponding hardware dependent microinstructions within a display list 430 in memory is the BuildDisplayList procedure:

BOOL BuildDisplayList (Batch*p)

This procedure takes a pointer (Batch*p) to a batch array 420 of the type, Batch, and builds a display in the system memory 102 or within RAM of the hardware unit 250. A series of these commands will build up a display list until FlushDisplayList is called to render the display list onto the screen 105. This procedure returns TRUE on success, otherwise FALSE.

EXEMPLARY HARDWARE DEPENDENT GRAPHICS LIBRARY TEXTURE MAPPING PROCEDURES 330

The texture mapping procedures of the HDGL 240, in one exemplary embodiment are illustrated below. The BOOL TextureHeapAlloc(WORD* pwHeapID, WORD wHeapSize)

procedure allocates memory from a texture heap. It is intended for a multi-user host to distinguish different processes and manage their own texture heap spaces. The 'wHeapSize' field represents the user's request for the heap size. This size has to be equal or smaller than the value 'wTextureAvail' that is obtained in the DisplayContext structure. This procedures returns TRUE on success, otherwise FALSE. On success the pointer, *pwHeapID, contains the heap handle that is assigned to the new heap space The HDGL 240 procedure:

BOOL RegisterTexture(WORD *pwTexID, LL_Texture* pTex)

registers a texture. All the texture information is read from a Texture data structure previously established by the user but not needed after the call. Texture data is converted to a hardware unit dependent format. The new data is either stored back into the same memory where the source texture data is located (e.g., it overwrites the source texture data), or if TEX_PROTECT bit is set in the 'dwFlag', or a new memory block is allocated for it, then the original source texture data is preserved. The pointer 'pTex' to the user source texture is preserved. The ID number of the texture that is registered is stored in a word pointed to by pwTexID. This procedure returns TRUE on success, otherwise FALSE. On success, the pointer *pwTexID contains the texture handle and N_LIB_MEM is set in dwFlags if hardware dependent texture format is stored in a private library heap instead of over the source texture data.

The HDGL 240 procedure:

BOOL FreeTexture(WORD wTexID)

frees the texture number wTexID that was returned by its registration. That texture can no longer be used and is released from the texture library heap if IN_LIB_MEM was set in dwFlags by the registration procedure.

The HDGL 240 procedure:

BOOL LoadTexture(WORD WTEXid)

loads a texture whose handle is wTexID into texture memory of the hardware unit 250. A texture is typically loaded before its wTexID is used in the wTexID member of a Batch structure. In one embodiment, this procedure may error due to the memory fragmentation caused by multiple loads and unloads of textures. In this case, the HeapCollect procedure is used for garbage collection with a retry of the LoadTexture. However, the Macro AutoHeapCollect(True) can be used to set the library into a mode in which garbage collection is performed automatically in the case of an unsuccessful load. This procedure returns TRUE on success, otherwise FALSE.

The HDGL 240 procedure:

BOOL UnloadTexture (WORD wTexID)

unloads a texture whose handle is wTexID from the private memory of the hardware unit 250. This procedure does not "free" the texture; the texture is still registered and can be reloaded at later time. The procedure returns TRUE on success, otherwise FALSE. The HDGL 240 procedure:

HeapCollect (WORD wHeapID)

performs garbage collection of the texture data in the private memory of the hardware unit 250. This procedure is used if LoadTexture fails due to memory fragmentation. The argument 'wHeapID' is the heap handle of the heap defragmented. That handle is obtained by a call to TextureHeapAlloc( ).

A heap collect macro is also used by this implementation of the HDGL 240:

AutoHeapCollect (WORD wHeapID, BOOL collect)

This procedure sets the automatic heap collection on or off for loading textures into the private texture memory of the hardware unit 250. The argument 'wHeapID' is the heap handle of the affected heap. That handle is obtained by a call to TextureHeapAlloc( ).

The preferred embodiment of the present invention, a low level hardware dependent graphics library interfacing between a high level hardware independent graphics library and a graphics hardware unit which also contains flexible and efficient graphics rendering procedures, is thus described. While the present invention has been described in particular embodiments, it should be appreciated that the present invention should not be construed as limited by such embodiments, but rather construed according to the below claims.

What is claimed is:

1. A computer controlled graphics display system comprising:

a processor coupled to a bus;

a memory unit for storing information;

a hardware graphics unit for receiving hardware dependent microinstructions from a display list stored in said memory unit and for generating an image onto a display screen;

a high level graphics library comprising hardware independent graphics rendering procedures executed by said processor, said hardware independent graphics rendering procedures for processing graphics rendering requests from a high level application to produce hardware independent output data structures including graphics operands; and a low level hardware dependent graphics library executed by said processor for processing said hardware independent output data structures to generate therefrom said microinstructions for said hardware graphics unit, wherein said high level graphics library is compatible with a variety of different hardware graphics units without redesign.

2. A system as described in claim 1 wherein said hardware independent output data structures comprise an array of batch cells, each batch cell representing a separate graphic operation to be performed and wherein said array of batch cells is passed to said low level hardware dependent graphics library to be processed in sequence to generate said microinstructions.

3. A system as described in claim 2 wherein said memory unit comprises a code cache and wherein said low level hardware dependent graphics library comprises parameterization procedures that are executed by said processor to generate said microinstructions, wherein said array of batch cells is processed without interruption by said parameterization procedures to prevent cache misses.

4. A system as described in claim 2 wherein said low level hardware dependent graphics library comprises parameterization procedures for processing polygon primitives, sets of graphics lines, and sets of graphics points.

5. A system as described in claim 4 wherein said parameterization procedures are further for processing bit level transfers, fills, and translations between texture map formats.

6. A system as described in claim 2 wherein said low level hardware dependent graphics library further comprises a performance/quality adjustment procedure executed by said processor for adjusting rendering performance rate and correspondingly adjusting rendering quality of said image displayed on said display screen.

7. A system as described in claim 6 wherein said performance/quality adjustment procedure executed by said processor is for adjusting level of linear and perspective subdivisions performed for graphics rendering and for adjusting level of error corrections factors used for polygon overlaps and for adjusting threshold primitive size for perspective rendering cut off.

8. A computer controlled graphics display system comprising:

a processor coupled to an address/data bus;

a memory unit for storing graphics information;

a hardware graphics unit for processing hardware dependent microinstructions stored in a display list and, in response thereto, for generating an image on a display screen;

a high level graphics library having hardware independent graphics rendering procedures executed by said processor, said hardware independent graphics rendering procedures for receiving graphics rendering requests from a high level application and for generating a hardware independent array of batch cells therefrom, each batch cell representing an individual graphics rendering operation including a graphics primitive; and a low level hardware dependent graphics library executed by said processor for receiving said array of batch cells from said graphics rendering procedures, said low level hardware dependent graphics library for parameterizing cells of said array of batch cells to generate said microinstructions for said hardware graphics unit.

9. A system as described in claim 8 wherein said memory unit comprises a code cache and a data cache and wherein said low level hardware dependent graphics library comprises parameterization procedures stored in said code cache and executed on cells of said array of batch cells stored in said data cache to generate said microinstructions, wherein said cells of said array of batch cells are processed without interruption by said parameterization procedures to prevent code cache misses.

10. A system as described in claim 8 wherein said low level hardware dependent graphics library comprises parameterization procedures executed by said processor for processing polygon primitives, sets of graphics lines, and sets of graphics points.

11. A system as described in claim 10 wherein said parameterization procedures are further for processing bit level transfers, fills, and performing texture map format translations.

12. A system as described in claim 8 wherein said low level hardware dependent graphics library further comprises a performance/quality adjustment procedure executed by said processor for adjusting rendering performance rate and correspondingly adjusting rendering quality of said graphic image displayed on said display screen.

13. A system as described in claim 12 wherein said performance/quality adjustment procedure executed by said processor is for adjusting level of linear and perspective subdivisions performed for graphics rendering and for adjusting level of error corrections factors used for polygon overlaps and for adjusting threshold primitive size for perspective rendering cut off.

14. In a computer controlled graphics system including a processor coupled to a bus, a memory unit for storing information, and a hardware graphics unit for rendering images on a display screen based on microinstructions within a display list, a method for constructing said display list comprising the computer implemented steps of:

generating a set of graphics rendering requests including requests for rendering graphics primitives including polygons, lines and points, using a high level application executed by said processor;

translating said set of graphics rendering requests into a hardware independent array of batch cells using hardware dependent procedures of a high level graphics library executed by said processor, each batch cell comprising an individual graphics operation;

receiving said hardware independent array of batch cells and generating therefrom a hardware dependent display list of microinstructions by sequentially processing cells of said array of batch cells using a low level hardware dependent graphics library, said low level hardware dependent graphics library executed by said processor; and accessing said display list and displaying an image on said display screen using said hardware graphics unit, wherein said high level graphics library is compatible with a variety of different hardware graphics units without redesign.

15. A method as described in claim 14 wherein said step of receiving said hardware independent array of batch cells and generating therefrom a hardware dependent display list of microinstructions comprises the steps of:

processing polygon primitives within said batch cells to generate display list microinstruction therefrom;

processing sets of lines within said batch cells to generate display list microinstructions therefrom; and processing sets of points within said batch cells to generate display list microinstructions therefrom.

16. A method as described in claim 15 wherein said step of receiving said hardware independent array of batch cells and generating therefrom a hardware dependent display list of microinstructions further comprises the steps of:

processing bit level transfers to generate display list microinstructions therefrom;

processing fill operations to generate display list microinstruction therefrom; and processing texture map translations to translate a texture map from one display format to another.

17. A method as described in claim 15 further comprising the steps of:

adjusting a setting of a performance/quality control panel rendered on said display screen;

increasing and decreasing rendering performance rate of said hardware graphic unit based on said setting; and correspondingly increasing and decreasing rendering quality of said hardware graphic unit based on said setting.

18. A method as described in claim 17 wherein said steps of increasing and decreasing rendering performance of said hardware graphic unit and correspondingly increasing and decreasing rendering quality of said hardware graphic unit based on said setting further comprise the steps of:

adjusting level of linear and perspective subdivisions performed for graphics rendering;

adjusting level of error corrections factors used during for polygon overlap; and adjusting threshold primitive size for perspective rendering cut off.

19. A method as described in claim 15 wherein said graphics rendering requests further include rendering operations of texture maps.

20. A method as described in claim 14 wherein said step of receiving said hardware independent array of batch cells and generating therefrom a hardware dependent display list of microinstructions comprises the steps of:

loading parameterization procedures of said hardware dependent graphics library into a cache memory unit; and preventing cache misses while processing said array of batch cells by sequentially executing said parameterization procedures from said cache unit on said cells of said array of batch cells without interruption.

* * * * *